April 23, 1929.　　C. E. HODECKER　　1,709,850

ELECTRIC SIGNAL LIGHT

Filed Dec. 1, 1924

WITNESS:
Gus. Hjelm

INVENTOR
C. E. Hodecker
BY H.J. Sanders
ATTORNEY.

Patented Apr. 23, 1929.

1,709,850

UNITED STATES PATENT OFFICE.

CHARLES EDWARD HODECKER, OF PITTSFIELD, MASSACHUSETT

ELECTRIC SIGNAL LIGHT.

Application filed December 1, 1924. Serial No. 753,198.

This invention relates to electric signal lights and its object is to provide a safety signal light for use by the drivers of automobiles to diplay a signal to following vehicles at night when it is desired to stop or turn across the path of such vehicles. It is now customary to hold out the hand as a signal on such occasions but at night this method is not effective. The light is also intended for use by pedestrians walking along country roads at night to warn vehicle drivers of their presence.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts throughout the several views.

Figure 3:
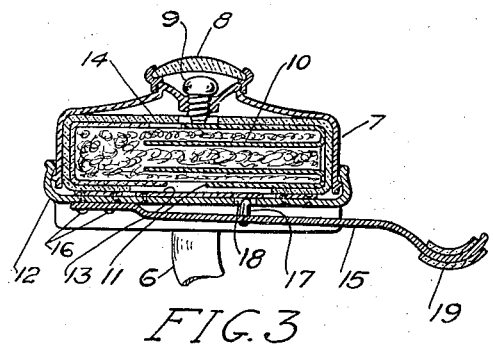
Fig. 3 is a vertical sectional view through Fig. 4.
Figure 4:
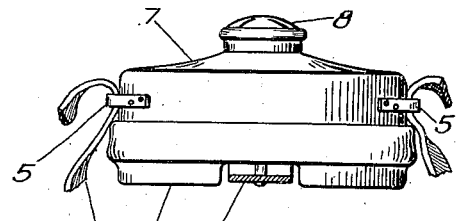
Fig. 4 is an enlarged view of the signal light in elevation.
Figure 1:
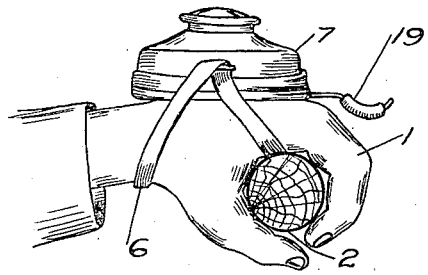
Fig. 1 is a view illustrating the application of the invention.
Figure 2:
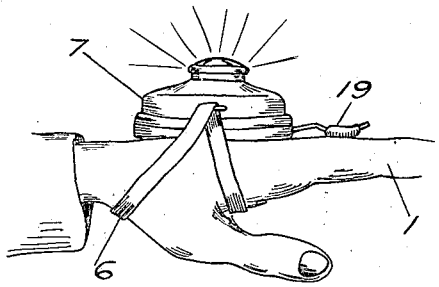
Fig. 2 is a similar view but with the light in operation.

In Figs. 1 and 2 the signal light is shown strapped to the hand 1 of a driver of a vehicle. When the hand is upon the steering wheel 2 of the vehicle the light does not function but when the hand is opened and the index, or other, finger brought in contact with the light switch the electric circuit is closed and the light lit.

The light comprises a casing 7, preferably of metal, provided with handles 5 which are engaged by the strap 6 which passes about the driver's hand to secure the light thereto. Referring now to Figs. 1 to 4 inclusive the light comprises a metal casing 7 provided with the lens 8 and lamp 9 fed by the battery, said battery comprising the plates 10, 11, the plate 10 constituting the positive plate while the plate 11 constitutes the negative plate. A filling A of suitable absorbent material is held within the casing and is saturated with electrolyte which supplies electric energy when contacting with the positive and negative plates 10 and 11 respectively.

To the casing 7 the base 12, of metal, is secured; said base having secured to the inner face thereof a flat spring 13, one end only of said spring being fastened to the base and the other end thereof being loose so that it may be forced upward or away from the base through a perforation formed in the insulation 14 for contact with the battery plate 11. A switch 15 is secured by pins 16 to the outside of the base 12 and is provided with a contact piece 17 that extends into a perforation 18 in the said base 12 for engagement with the free end of the spring 13. The switch 15 extends beyond the base 12 and at its free end is provided with a rubber pad 19 adapted for engagement by the driver's index finger as shown in Fig. 2 to close the electric circuit and light the lamp. When the switch 15 is moved toward the base and contacts with the same a circuit is completed from battery plate 11, spring 13, base 12 and casing 7 to the lamp and back to the battery plate 10.

Figure 5:
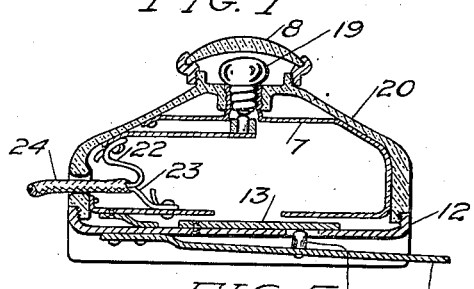
Fig. 5 is a sectional view through a slightly modified form of the device.
Figure 6:
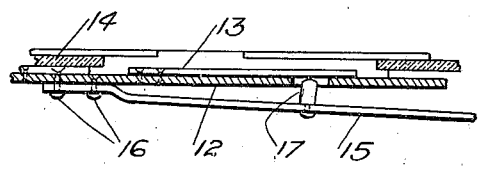
Fig. 6 is a fragmentary view, enlarged, of Fig. 3.

In Fig. 5 a modified form is shown. The casing 7 is provided with insulation 20 to which the base 12 is secured, said base having the switch 15 secured thereto and carrying a contact piece 17 that extends through a perforation in the base for engagement with the spring 13 to cause the same to contact with the metal casing 7. The lamp 9 is fed by the wires 22, 23 that extend through insulation 24 which is provided with a plug to fit an electric socket in the vehicle. In this manner the light may be hooked up with the vehicle battery.

What is claimed is:—

1. A signaling device to be strapped to the back of the hand, including a casing having a lamp opening, an insulating casing within the first mentioned casing, said insulating casing having an opening in its upper surface and an opening in its lower surface, battery plates within the insulating casing, each of the battery plates including a length of sheet metal material constructed to closely fit within the insulating casing, said plates having inwardly extended spaced parallel members defining positive and negative plates of the battery, fibrous packing material wet with electrolyte, surrounding the plates, a lamp supported in the lamp opening and extending through the opening in the upper surface of the insulating casing and contacting with one of the battery plates to receive electric energy therefrom, a spring member secured to the first mentioned casing and in circuit therewith, and a switch member extending through the opening in the bottom of the casing for moving the spring member into engagement with a battery plate to complete the circuit to the lamp.

2. A signaling device to be strapped to the back of the hand, and including a casing, battery elements within the casing, absorbent material wet with electrolyte surrounding the battery elements, to provide a battery, a lamp supported by the casing and in circuit with a battery element, a switch member within the casing and normally in circuit with one of the battery elements and adapted to move into engagement with one of the battery elements to complete a circuit to the lamp, said casing having an opening in its bottom, a switch member secured to the bottom of the casing, a pin on the last mentioned switch member and extending through the opening in the bottom to engage the first mentioned switch member to move the first mentioned switch member into engagement with a battery element and the last mentioned switch member adapted to rest against the back of the hand of the user to move the last mentioned switch member towards the casing when the hand is bent.

In testimony that I claim the foregoing as my own I have hereto affixed my signature.

CHARLES EDWARD HODECKER.